March 3, 1936.    B. W. JONES ET AL    2,032,937
REMOTE CONTROL SYSTEM
Filed Oct. 16, 1934
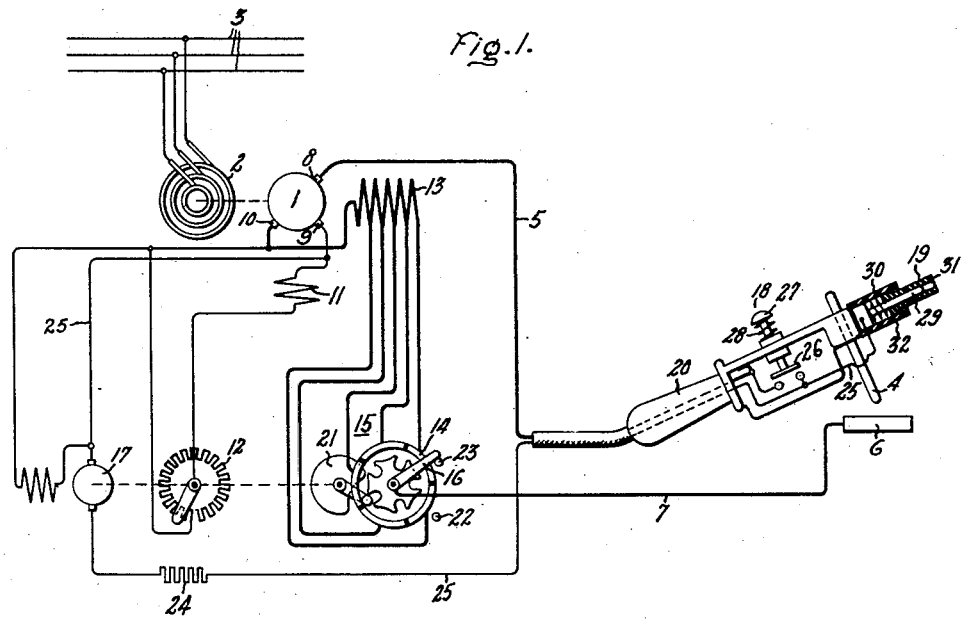
Inventors:
Benjamin W. Jones,
Lincoln D. Meeker,
by Harry E. Dunham
Their Attorney.

Patented Mar. 3, 1936

2,032,937

UNITED STATES PATENT OFFICE 2,032,937

REMOTE CONTROL SYSTEM

Benjamin W. Jones, Schenectady, and Lincoln D. Meeker, Scotia, N. Y., assignors to General Electric Company, a corporation of New York Application October 16, 1934, Serial No. 748,504

8 Claims. (Cl. 219—8)

Our invention relates to remote control systems, and more particularly to control systems by means of which a welding operator at the point of welding may conveniently control the characteristics of a remotely located welding source employed in performing the welding operation.

It is an object of our invention to provide such a system which is simple and positive in operation.

It is a further object of our invention to provide a system in which a simple control means accessible to the operator at the point of welding is employed for controlling the welding current.

It is a further object of our invention to provide such a system in which a single conductor in addition to the welding current conductors is employed for securing the desired control.

A further object of our invention is to provide such a system in which the electrode holder used by the welder is of light weight and embodies distinctly different control members by means of which the operator may raise or lower the voltage of the generator.

Further objects of our invention will become apparent from a consideration of the following description taken in connection with the accompanying drawing, Fig. 1 of which illustrates one embodiment of our invention, and Fig. 2 of which illustrates a modification of the control illustrated in Fig. 1.

In the particular embodiment of our invention illustrated in Fig. 1 of the drawing, the welding generator 1 is mechanically connected to and driven by an alternating current motor 2 which is electrically connected to an alternating current source of supply 3. It is to be understood, however, that any suitable means may be used for driving the welding generator which is connected to the welding electrode 4 by a welding current conductor 5 and to the work 6 by a welding current conductor 7.

The generator 1 may be of any suitable type. It is illustrated in Fig. 1 as a generator having the construction described and claimed in U. S. Letters Patent No. 1,340,004, Sven L. Bergman, granted May 11, 1920. In this type of generator the electromotive force generated between a main brush 10 and an auxiliary brush 9 is substantially constant while the electromotive force generated between the auxiliary brush 9 and the other main brush 8 changes in value and direction in accordance with the conditions of the arc. The arcing voltage derived from such a generator is the algebraic sum of the voltages generated between the auxiliary brush 9 and each of the main brushes 8 and 10. The generator is illustrated as having a field 11 connected through a rheostat 12 to the substantially constant potential between brushes 10 and 9, and a series field 13 provided with taps which are connected to segments 14 by a tap switch 15, the position of the arm 16 of which determines the number of series field turns connected in the welding circuit 5, 7. The rheostat 12 and the tap switch 15 are mechanically connected to and driven by a pilot motor 17 which is rotated in one direction or the other, depending on the operation of the control members 18 or 19 forming part of the electrode holder 20. The tap switch 15 is operated through a Geneva movement 21 to change the number of turns of the series field 13 connected in the welding circuit at the time the rheostat 12 changes from a maximum to a minimum or a minimum to a maximum position due to the rotation imparted thereto by pilot motor 17. Stops 22 and 23 located in the path of movement of the arm 16 of the tap switch positively limits the maximum and minimum excitation of the generator 1 by stalling the pilot motor 17. A resistance 24 connected in series circuit with the pilot motor 17 is provided for accomplishing this operation without damage to the pilot motor. By thus controlling the fields of the generator 1 a wide range of adjustment is provided.

The pilot motor 17 is connected across brushes 8 and 9 of the welding generator through control member 18 for one direction of rotation and across brushes 9 and 10 of the welding generator through control member 19 for the opposite direction of rotation. These circuits are completed through control conductor 25 and welding current conductors 5 or 7. The control conductor 25 may for the most part be combined with welding current conductor 5 to form a twin conductor cable. This is a distinct advantage for the welder thus has to handle only what appears to be the usual welding conductor which he has always had to use. The twin conductor will not be noticeably larger or heavier than the usual welding conductor for the control conductor is quite small as it only has to conduct the small current supplied to pilot motor 17. The control member 18 is illustrated as a switch 26 operated by push button 27. This switch is normally biased to an open position by a spring 28. The control member 19 is illustrated as a terminal 29 insulated by sleeves 30 and 31. The sleeve 31 when depressed against the action of a spring 32 telescopes within the sleeve 30 exposing the terminal 29.

The circuit connections illustrated in Fig. 1 may most simply be described by describing the operation of the system.

In the drawing the rheostat 12 and tap switch 15 are illustrated in the positions they assume when the generator has its maximum excitation and, consequently, its maximum voltage. If the welding operator upon initiation of a welding operation finds that this voltage is too great, he can reduce it by touching the control member 19 to the work 6. This act on the part of the operator completes an operating circuit for pilot motor 17 as follows: from main brush 10 of generator 1 through welding current conductor 7, work 6, terminal 29 and control conductor 25 to the auxiliary brush 9 of the welding generator. With this connection established the pilot motor 17 will rotate in a direction to insert resistance in the field 11 of the generator 1, and if this rotation is maintained until all of the resistance of the rheostat 12 has been inserted in circuit with field 11 the motor 17 will operate tap switch 15 to decrease the number of series field turns 13 of the generator connected in the welding circuit. If after this adjustment, the welding operator should desire to increase the voltage of the welding generator he may accomplish this by closing switch 26 by depressing push button 27. The closure of switch 26 completes an operating circuit for pilot motor 17 as follows: from auxiliary brush 9 of the welding generator 1 through control conductor 25, switch 26, and welding current conductor 5 to the main brush 8 of the welding generator. With this connection established the pilot motor 17 will rotate in the opposite direction to increase the voltage of the generator 1 through the agency of rheostat 12 and tap switch 15.

It is thus apparent that the welding operator has on the electrode holder two distinctive control members by means of which the voltage of the welding generator may be raised or lowered. These control members are of such a different nature that it is impossible for the operator to confuse the effects produced by the use of one or the other thereof. It is also apparent that the control members do not render the electrode holder cumbersome or in any way interfere with the normal welding operation by means of which welding current is supplied to the electrode supported therein by a suitable clamp which is connected to welding current conductor 5.

In Fig. 2 we have illustrated our invention as applied to a system employing a constant potential welding generator 33 in whose load current there is connected a resistance 34 for obtaining the desired welding characteristics. When such a generator is used one terminal of the pilot motor 17 may be connected to a tap 37 of a potentiometer 38 connected across the load brushes 39 and 40 of the welding generator. The potentiometer furnishes a substitute for the auxiliary brush 9 of the welding generator employed in Fig. 1.

Although as illustrated and described above, the control members 18 and 19 form a part of the electrode holder, it is apparent that our invention is not limited to such a construction. An independent control means accessible to the welding operator at the point of welding may be provided without departing from our invention. Such control means would embody control members 18 and 19 or other means for selectively completing a connection to either of the welding current conductors. When such a control means is employed the electrode holder may be of the usual construction.

The particular embodiments described illustrate ways of applying our invention. Various other embodiments of our invention will occur to those skilled in the art. We desire, therefore, to cover all such modifications and variations as fall within the scope of our invention as set forth in the appended claims.

What we claim as new and desire to secure by Letters Patent of the United States is:

1. Arc welding apparatus comprising a source of welding current, a welding current conductor one terminal of which is connected to one terminal of said source of welding current and the other terminal of which is adapted to be connected to an electrode holder, a second welding current conductor one terminal of which is connected to the other terminal of said source of welding current and the other terminal of which is adapted to be connected to the work to be welded, control means accessible to the welding operator at the point of welding for selectively completing a connection to either of said welding current conductors, a control conductor one terminal of which is connected to said control means, and means energized through said control conductor for altering or reversely altering a characteristic of said source of welding current depending on the completion of a circuit through said control means to one or the other of said welding current conductors.

2. Arc welding apparatus comprising a source of welding current, an electrode holder, welding current conductors, one of which connects said electrode holder to one terminal of said source of welding current and the other of which is connected to the other terminal of said source of welding current and is adapted to be connected to the work to be welded, a control conductor, a terminal forming a part of said electrode holder and connected to said control conductor, a switch also forming a part of said electrode holder and connecting said control conductor to the welding current conductor connected to said holder, and means energized through said control conductor for altering or reversely altering a characteristic of said source of welding current depending on the closure of said switch or the engagement of said terminal with the work to be welded.

3. Arc welding apparatus comprising a source of welding current, an electrode holder having an electrode clamp, a terminal adapted to make engagement with the work to be welded, and a switch one contact of which is connected to said clamp, welding current conductors one of which connects said electrode clamp to one terminal of said source of welding current and the other of which is connected to the other terminal of said source of welding current and is adapted to be connected to the work to be welded, a control conductor connected to said terminal and to the other contact of said switch, and means energized through said control conductor for altering or reversely altering a characteristic of said source of welding current depending upon the closure of said switch, or the engagement of said terminal with the work to be welded.

4. Arc welding apparatus comprising a source of welding current, a source of potential intermediate the potential of the terminals of said source of welding current, means for altering or reversely altering a characteristic of said source of welding current, means including an electric motor for operating said last mentioned means, one terminal of said motor being connected to said source of potential, a welding current conductor connected to one terminal of said source of welding current and adapted to be connected to the work to be welded, a second welding current conductor connected to the other terminal of said source of welding current and adapted to be connected to an electrode holder, control means accessible to the welding operator at the point of welding for selectively completing a connection to said last mentioned welding current conductor or to the work, and a control conductor connecting said control means to the other terminal of said motor.

5. Arc welding apparatus comprising a source of welding current, a source of potential intermediate the potential of the terminals of said source of welding current, means for altering or reversely altering a characteristic of said source of welding current, means including an electric motor for operating said last mentioned means, one terminal of said motor being connected to said source of intermediate potential, an electrode holder having an electrode clamp, a switch, and a terminal adapted to make engagement with the work to be welded forming a part thereof, a welding current conductor connected to one terminal of said source of welding current and adapted to be connected to the work to be welded, a second welding current conductor connecting the other terminal of said source of welding current to said electrode clamp, and a control conductor connecting the other terminal of said motor to said terminal and through said switch to said welding current conductor connected to said clamp.

6. Arc welding apparatus comprising a welding generator having main brushes and an auxiliary brush the potential of which is intermediate the potential of said main brushes, an electrode holder, welding current conductors, one of which connects said electrode holder to one of the main brushes of said generator and the other of which is connected to the other main brush of said generator and is adapted to be connected to the work to be welded, a control conductor, a terminal forming a part of said electrode holder and connected to said control conductor, a switch also forming a part of said electrode holder and connecting said control conductor to the welding current conductor connected to said holder, and means connected to the auxiliary brush of said generator through said control conductor for raising or lowering the voltage of said generator depending on the closure of said switch or the engagement of said terminal with the work to be welded.

7. Arc welding apparatus comprising a welding generator having main brushes and an auxiliary brush the potential of which is intermediate the potential of said main brushes, an electrode holder, welding current conductors, one of which connects said electrode holder to one of the main brushes of said generator and the other of which is connected to the other main brush of said generator and is adapted to be connected to the work to be welded, a control conductor, a terminal forming a part of said electrode holder and connected to said control conductor, a switch also forming a part of said electrode holder and connecting said control conductor to the welding current conductor connected to said holder, means for raising or lowering the voltage of said generator, and means comprising an electric motor for operating said last mentioned means, one terminal of said motor being connected to the auxiliary brush of said generator and the other terminal of said motor being connected to said control conductor.

8. Arc welding apparatus comprising a welding generator having main brushes and an auxiliary brush the potential of which is intermediate the potential of said main brushes, means including an electric motor for raising or lowering the voltage of said generator, one terminal of said motor being connected to said auxiliary brush, an electrode holder having an electrode clamp, a switch, and a terminal adapted to make engagement with the work to be welded forming a part thereof, a welding current conductor connected to one of the main brushes of said generator and adapted to be connected to the work to be welded, a second welding current conductor connected to the other main brush of said generator and to said electrode clamp, and a control conductor connecting the other terminal of said motor to said terminal and through said switch to said welding current conductor connected to said clamp, said control conductor and said welding current conductor connected to said clamp forming a twin conductor extending from said electrode holder to said generator and its voltage controlling means.

BENJAMIN W. JONES.
LINCOLN D. MEEKER.